United States Patent
Li et al.

(10) Patent No.: US 9,948,913 B2
(45) Date of Patent: Apr. 17, 2018

(54) IMAGE PROCESSING METHOD AND APPARATUS FOR PROCESSING AN IMAGE PAIR

(71) Applicant: Samsung Electronics Co., Ltd., Suwon-si, Gyeonggi-do (KR)

(72) Inventors: Weiming Li, Beijing (CN); Zhihua Liu, Beijing (CN); Xiying Wang, Beijing (CN); Yang Ho Cho, Seongnam-si (KR); Kang Xue, Beijing (CN); Mingcai Zhou, Beijing (CN); Tao Hong, Beijing (CN); Gengyu Ma, Beijing (CN); Haitao Wang, Beijing (CN)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 11 days.

(21) Appl. No.: 14/935,757

(22) Filed: Nov. 9, 2015

(65) Prior Publication Data
US 2016/0189380 A1    Jun. 30, 2016

(30) Foreign Application Priority Data

Dec. 24, 2014 (CN) .......................... 2014 1 0814752
Aug. 10, 2015 (KR) ........................ 10-2015-0112708

(51) Int. Cl.
*H04N 13/00* (2006.01)
(52) U.S. Cl.
CPC ....... *H04N 13/0022* (2013.01); *H04N 13/007* (2013.01); *H04N 13/0018* (2013.01); *H04N 2013/0081* (2013.01)

(58) Field of Classification Search
None
See application file for complete search history.

(56) References Cited

U.S. PATENT DOCUMENTS 5,872,857 A * 2/1999 Chodos ................. G01S 3/7864
                                                    348/171
6,608,923 B1   8/2003 Zhang et al.
(Continued)

FOREIGN PATENT DOCUMENTS

EP    2540088 A1    1/2013
JP    2011-253376 A    12/2011
(Continued)

OTHER PUBLICATIONS

Zhang, Liang, and Wa James Tam. "Stereoscopic image generation based on depth images for 3D TV." IEEE Transactions on broadcasting 51.2 (2005): 191-199.*
(Continued)

*Primary Examiner* — Michelle M Hausmann
(74) *Attorney, Agent, or Firm* — Harness, Dickey & Pierce, P.L.C.

(57) ABSTRACT

An image processing method and apparatus are provided. The image processing method may include determining whether stereoscopic objects that are included in an image pair and that correspond to each other are aligned on the same horizontal line. The method includes determining whether the image pair includes target objects having different geometric features from those of the stereoscopic objects if the stereoscopic objects are not aligned on the same horizontal line. The method includes performing image processing differently for the stereoscopic objects and for the target objects if the image pair includes the target objects.

18 Claims, 9 Drawing Sheets

(56) References Cited

U.S. PATENT DOCUMENTS

| | | | |
|---|---|---|---|
| 6,778,703 B1* | 8/2004 | Zlotnick | G06K 9/00449 382/218 |
| 7,660,458 B1* | 2/2010 | Saric | G06T 7/0075 382/154 |
| 8,494,254 B2 | 7/2013 | Jin et al. | |
| 8,593,524 B2 | 11/2013 | Kleihorst | |
| 9,202,315 B2* | 12/2015 | Kobayashi | H04N 13/0018 |
| 2003/0169817 A1* | 9/2003 | Song | G11B 27/28 375/240.13 |
| 2007/0048715 A1* | 3/2007 | Miyamoto | G06F 17/2745 434/308 |
| 2009/0115780 A1* | 5/2009 | Varekamp | G06T 15/205 345/419 |
| 2011/0292176 A1 | 12/2011 | Jung et al. | |
| 2012/0007953 A1* | 1/2012 | Sung | H04N 13/0018 348/46 |
| 2012/0099836 A1 | 4/2012 | Welsh et al. | |
| 2012/0105435 A1* | 5/2012 | Chen | G06T 15/205 345/419 |
| 2012/0320155 A1* | 12/2012 | Suh | H04N 13/0018 348/43 |
| 2013/0106848 A1* | 5/2013 | Nguyen | H04N 13/0011 345/419 |
| 2013/0113892 A1* | 5/2013 | Nakamaru | G03B 35/18 348/47 |
| 2013/0135298 A1* | 5/2013 | Isogai | G06T 15/205 345/419 |
| 2014/0009462 A1 | 1/2014 | McNamer et al. | |
| 2014/0053224 A1 | 2/2014 | Tsukagoshi | |
| 2014/0201126 A1* | 7/2014 | Zadeh | G06K 9/627 706/52 |
| 2015/0138315 A1* | 5/2015 | Shimizu | H04N 13/0022 348/43 |
| 2015/0221126 A1* | 8/2015 | Liu | G06T 15/20 382/276 |
| 2016/0110613 A1* | 4/2016 | Ghanem | G06T 7/2006 382/103 |

FOREIGN PATENT DOCUMENTS

| | | |
|---|---|---|
| KR | 2010-0095321 A | 8/2010 |
| KR | 2012-0020131 A | 3/2012 |
| KR | 2012-0111909 A | 10/2012 |
| WO | WO-2006/009257 A1 | 1/2006 |
| WO | WO-2011/105993 A1 | 9/2011 |

OTHER PUBLICATIONS

Mark, William R., and Gary Bishop. Post-rendering 3 D image warping: visibility, reconstruction, and performance for depth-image warping. Diss. University of North Carolina at Chapel Hill, 1999.*

Hsu, Hsiao-An, Chen-Kuo Chiang, and Shang-Hong Lai. "Spatio-temporally consistent view synthesis from video-plus-depth data with global optimization." IEEE Transactions on Circuits and Systems for Video Technology 24.1 (2014): 74-84.*

Kim, Hak Gu, and Yong Man Ro. "Multiview Stereoscopic Video Hole Filling Considering Spatiotemporal Consistency and Binocular Symmetry for Synthesized 3D Video." IEEE Transactions on Circuits and Systems for Video Technology 27.7 (2017): 1435-1449.*

Daribo, Ismaël, and Hideo Saito. "A novel inpainting-based layered depth video for 3DTV." IEEE Transactions on Broadcasting 57.2 (2011): 533-541.*

Habigt, Julian, and Klaus Diepold. "Image completion for view synthesis using markov random fields and efficient belief propagation." Image Processing (ICIP), 2013 20th IEEE International Conference on. IEEE, 2013.*

Hewage, Chaminda TER, and Maria G. Martini. "Joint error concealment method for backward compatible 3D video transmission." Vehicular Technology Conference (VTC Spring), 2011 IEEE 73rd. IEEE, 2011.*

Sang-Beom Lee et al. "Segment-Based Multi-view Depth Map Estimation using Belief Propagation from Dense Multi-view Video," 3DTV Conference: The True Vision—Capture, Transmission and Display of 3D Video, May 28, 2008.

* cited by examiner

IMAGE PROCESSING METHOD AND APPARATUS FOR PROCESSING AN IMAGE PAIR

CROSS-REFERENCE TO RELATED APPLICATION(S)

This application claims under 35 U.S.C. § 119 to Chinese Patent Application No. 201410814752.1, filed on Dec. 24, 2014, in the State Intellectual Property Office of China, and Korean Patent Application No. 10-2015-0112708, filed on Aug. 10, 2015, in the Korean Intellectual Property Office, the entire disclosures of which are incorporated herein by reference for all purposes.

BACKGROUND

1. Field

At least one example embodiment relates to a method and/or apparatus for processing an image.

2. Description of the Related Art

A three-dimensional (3D) display technology enables a viewer to three-dimensionally perceive a displayed object by sending different images to both eyes of the viewer based on principles of stereoscopic vision. Accordingly, in an image pair included in a 3D video, there is a difference between viewpoints in a horizontal direction that occurs due to the principles of stereoscopic vision, but no difference between viewpoints in a vertical direction.

SUMMARY

Some example embodiments relate to an image processing method.

In some example embodiments, the image processing method may include determining whether stereoscopic objects are aligned on the same horizontal line, the stereoscopic objects being included in an image pair and corresponding to each other, determining whether the image pair includes target objects, when the stereoscopic objects are determined not to be aligned on the same horizontal line, the target objects having different geometric features from those of the stereoscopic objects, and performing image processing differently for the stereoscopic objects and for the target objects when the image pair is determined to include the target objects.

The image pair may include images acquired by capturing the same scene at different viewpoints.

The performing may include separating the target objects from the image pair, compensating for image holes generated by separating the target objects from the image pair, and performing image processing on the image pair with the compensated image holes.

The separating may include separating the target objects from the image pair based on at least one of a morphological feature, a temporal feature and a geometric feature of each of the target objects, the geometric feature meeting a standard.

The target objects may be caption-type target objects. The separating may include extracting caption areas from the image pair based on the morphological feature, identifying pixels corresponding to the caption-type target objects in the caption areas based on pixel values included in the caption areas, and separating the identified pixels from the image pair.

The separating may further include matching the caption areas in the image pair and determining a depth of each of the caption areas, and determining, based on the depth, whether the caption areas are to be removed.

The target objects may be icon-type target objects. The separating may include matching icon areas in the image pair based on a template image formed and associated with icons, and separating the matched icon areas from the image pair.

The template image may be determined based on last updated pixel values by updating pixel values of the template image based on a difference in pixel values between the image pair and a neighboring image pair temporally adjacent to the image pair, and the updating may be repeated until a rate of change in the pixel values due to the updating is less than a set threshold rate.

The separating may include dividing a first image included in the image pair into a plurality of patches, matching the plurality of patches to a second image, the second image being included in the image pair and corresponding to the first image, and separating target objects determined based on a result of the matching from the image pair.

The matching may include calculating a matching score indicating a similarity between the plurality of patches and areas of the second image, the areas being on the same horizontal line as the plurality of patches. The separating may include determining the target objects based on the matching score and separating the determined target objects from the image pair.

The compensating may include compensating for the image holes based on areas other than the image holes in the image pair.

The compensating may include compensating for the image holes based on one of a scheme of compensating for a pixel included in the image hole based on values of pixels closest to the pixel in the image hole among pixels included in the other areas, a scheme of compensating for the image holes based on a texture feature of a pixel adjacent to the image hole, a scheme of estimating content information of the image pair based on type information of an object adjacent to the image hole and compensating for the image holes based on the estimated content information, and a scheme of compensating for the image holes based on a first image and a second image that are included in the image pair.

The image processing method may further include performing image processing on the separated target objects, and adding the target objects on which the image processing is performed to the image pair on which the image processing is performed.

The determining whether the stereoscopic objects are aligned on the same horizontal line may include determining whether the image pair corresponds to a boundary frame of a video segment, the image pair being included in the video segment, estimating a geometric feature of the image pair and determining whether the stereoscopic objects are aligned on the same horizontal line, when the image pair is determined to correspond to the boundary frame, and determining, based on estimated information about the video segment, whether the stereoscopic objects are aligned on the same horizontal line, when the image pair is determined not to correspond to the boundary frame.

The determining whether the image pair corresponds to the boundary frame may include comparing an image feature vector of the image pair to an image feature vector of a previous image pair preceding the image pair, and determining whether the image pair corresponds to the boundary frame.

The determining whether the stereoscopic objects are aligned on the same horizontal line when the image pair is determined to correspond to the boundary frame may include determining whether the first image and the second image in the image pair are different from each other in viewpoints in a vertical direction.

Each of the target objects may be a post inserted object added to an image pair acquired by capturing a stereoscopic object during editing of the image pair.

Other example embodiments relate to an image processing apparatus.

In some example embodiments, the image processing apparatus may include a communicator configured to receive an image pair included in a three-dimensional (3D) video, and a processor configured to perform image processing on the image pair. The processor may be configured to determine whether stereoscopic objects are aligned on the same horizontal line, the stereoscopic objects being included in the image pair and corresponding to each other, configured to determine whether the image pair includes target objects, when the stereoscopic objects are determined not to be aligned on the same horizontal line, the target objects having different geometric features from those of the stereoscopic objects, and configured to perform image processing differently for the stereoscopic objects and for the target objects when the image pair is determined to include the target objects.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which.

DETAILED DESCRIPTION OF EXAMPLE EMBODIMENTS

Figure 1:
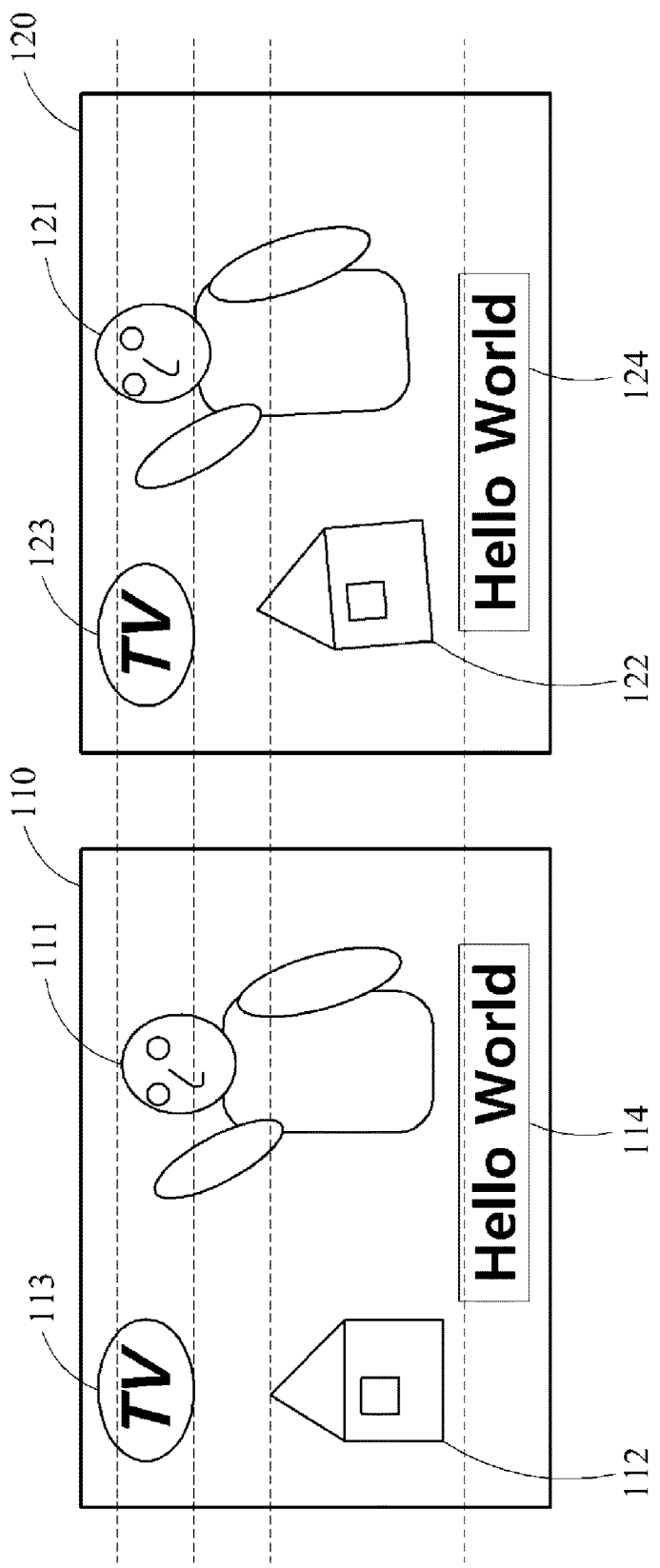
FIG. 1 is a diagram illustrating an example of an image pair according to at least one example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

It should be understood, however, that there is no intent to limit this disclosure to the particular example embodiments disclosed. On the contrary, example embodiments are to cover all modifications, equivalents, and alternatives falling within the scope of the example embodiments. Like numbers refer to like elements throughout the description of the figures.

In addition, terms such as first, second, A, B, (a), (b), and the like may be used herein to describe components. Each of these terminologies is not used to define an essence, order or sequence of a corresponding component but used merely to distinguish the corresponding component from other component(s). It should be noted that if it is described in the specification that one component is "connected", "coupled", or "joined" to another component, a third component may be "connected", "coupled", and "joined" between the first and second components, although the first component may be directly connected, coupled or joined to the second component.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Various example embodiments will now be described more fully with reference to the accompanying drawings in which some example embodiments are shown. In the drawings, the thicknesses of layers and regions are exaggerated for clarity.

FIG. 1 illustrates an example of an image pair according to at least one example embodiment.

A three-dimensional (3D) video refers to a set of images three-dimensionally representing an object displayed on a display panel based on principles of stereoscopic vision using both eyes of a viewer. The 3D video may include sending at least two images to both eyes of the viewer.

Hereinafter, an image processing method based on two images included in a 3D video (for example, an image pair including a left image and a right image) will be described. However, description of the image processing method is not limited to an example of the 3D video to which the image processing method is applied, and may equally be applicable to a multi-view 3D video including images corresponding to multiple views. For example, the image processing method may equally be applicable to images corresponding to two neighboring views among images included in a multi-view 3D video.

FIG. 1 illustrates a first image 110 and a second image 120 included in an image pair. The first image 110 and the second image 120 may refer to images (for example, a left image and a right image) acquired by capturing the same scene at different viewpoints.

The image pair may include a stereoscopic object and a target object. The stereoscopic object may refer to an object captured by an image sensor, and may be, for example, a first stereoscopic object 111 and a second stereoscopic object 112 included in the first image 110, and a first stereoscopic object 121 and a second stereoscopic object 122 included in the second image 120.

The target object may refer to an object added to an image captured by and received from an image sensor during editing the image, and may include, for example, a caption, an icon or a graphics object. The target object may be used to additionally explain content included in an image, and may include a variety of information to help a viewer understand the image. The target object may have a geometric feature meeting a standard. The target object may refer to an object inserted post-capture and/or a later joined object. In FIG. 1, a first target object 113 and a second target object 114 included in the first image 110, and a first target object 123 and a second target object 124 included in the second image 120.

Objects included in the image pair may correspond to each other. The first stereoscopic object 111 may correspond to the first stereoscopic object 121. Similarly, the second stereoscopic object 112 may correspond to the second stereoscopic object 122. The first target object 113 and the second target object 114 may correspond to the first target object 123 and the second target object 124, respectively.

In an ideal image pair, objects corresponding to each other may be aligned on the same horizontal line. In other words, the objects corresponding to each other in the ideal image pair may be different from each other in viewpoints in a horizontal direction, not a vertical direction.

However, when a 3D error occurs in stereoscopic objects corresponding to each other in an image pair, the stereoscopic objects are not aligned on the same horizontal line. The 3D error may occur due to a camera parameter error between image sensors that capture the same scene at different viewpoints. The camera parameter error may include, for example, an error of a relative position between the image sensors, or a mismatch between image generation parameters used when each of the image sensors generates an image. The 3D error may occur in a stereoscopic object in the image pair, but not occur in a target object added to the image pair based on a geometric feature meeting a standard.

The 3D error may refer to a phenomenon in which objects corresponding to each other are not aligned on the same horizontal line, or a phenomenon in which objects corresponding to each other are different from each other in viewpoints in the vertical direction. Information about depths of objects included in an image pair may be calculated based on a difference in viewpoints between the objects, however, inexact information about the depths of the objects may be acquired due to the 3D error. Due to an occurrence of a 3D error, a quality of a 3D video may be reduced, and a visual fatigue of a user viewing the 3D video may increase.

In FIG. 1, the first stereoscopic objects 111 and 121 are not aligned on the same horizontal line due to the 3D error. Also, the second stereoscopic objects 112 and 122 are not aligned on the same horizontal line due to the 3D error.

When 3D errors occur in the first stereoscopic objects 111 and 121 and the second stereoscopic objects 112 and 122, the first stereoscopic objects 111 and 121 and the second stereoscopic objects 112 and 122 have different geometric features from those of the first target objects 113 and 123 and the second target objects 114 and 124, which may lead to a discontinuous change in the geometric features between the first stereoscopic objects 111 and 121 and the second stereoscopic objects 112 and 122, and the first target objects 113 and 123 and the second target objects 114 and 124.

For example, a correction of the image pair (for example, a geometric transformation) may be performed based on the 3D errors in the first stereoscopic objects 111 and 121 and the second stereoscopic objects 112 and 122. In this example, because a target object is also corrected, a new 3D error may occur in the target object. In other words, during correction of the image pair, a target object in which a 3D error does not occur may also be adjusted, and accordingly a new 3D error may occur in the target object. To reduce (or alternatively, prevent) a 3D error from occurring in the target object, the 3D error in the first stereoscopic objects 111 and 121 and the second stereoscopic objects 112 and 122 should be corrected without adjusting the first target objects 113 and 123 and the second target objects 114 and 124. Thus, image processing may be performed differently for the first stereoscopic objects 111 and 121 and the second stereoscopic objects 112 and 122, and for the first target objects 113 and 123 and the second target objects 114 and 124.

Figure 2:
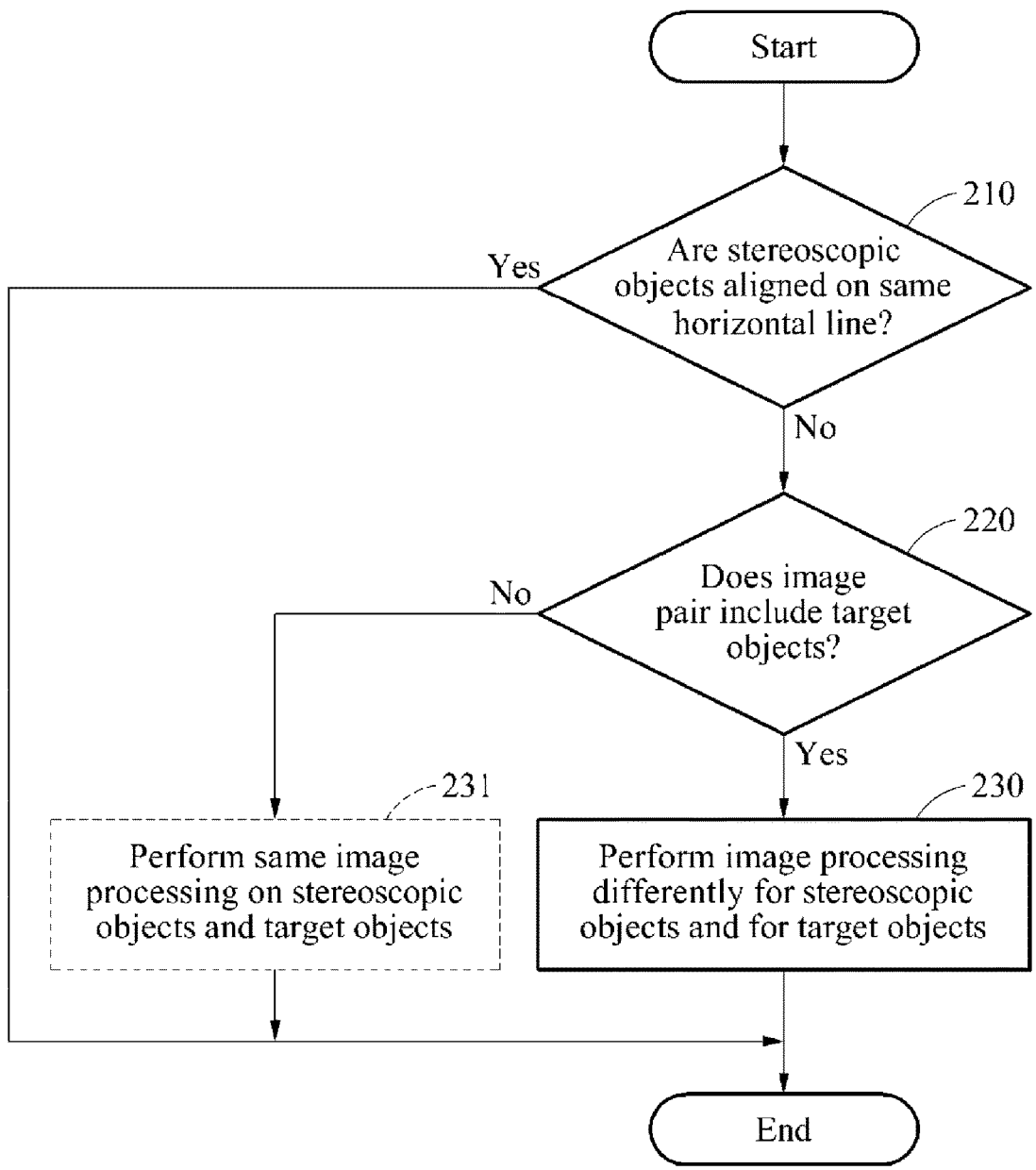
FIG. 2 is a flowchart illustrating an image processing method according to at least one example embodiment.

FIG. 2 illustrates an image processing method according to at least one example embodiment.

The image processing method of FIG. 2 may be performed by a processor included in an image processing apparatus according to at least one example embodiment.

The image processing apparatus (e.g., image processing apparatus 900 in FIG. 9) may perform image processing on image pairs extracted from a 3D video. The image pair may include images (for example, a left image and a right image) acquired by capturing the same scene at different viewpoints.

Referring to FIG. 2, in operation 210, the image processing apparatus may determine whether stereoscopic objects are aligned on the same horizontal line. The stereoscopic objects may be included in an image pair and may correspond to each other. When the stereoscopic objects are determined to be aligned on the same horizontal line, operations 220 and 230 are not performed as there is no desire for correction.

Operation 210 will be further described with reference to FIG. 3 below.

When the stereoscopic objects are determined not to be aligned on the same horizontal line, the image processing apparatus may determine whether the image pair includes target objects in operation 220. The target objects may have different geometric features from those of the stereoscopic objects. Thus, the image processing apparatus may determine whether the image pair includes target objects by comparing objects from capture the image pair and objects in the edited version of the captured image pair. By determining whether the image pair includes the target objects, the image processing apparatus may reduce (or alternatively, prevent) a correction of a 3D error occurring in the stereoscopic objects from being equally applied to the target objects.

When the image pair is determined to include the target objects, the image processing apparatus may perform image processing differently for the stereoscopic objects and for the target objects in operation 230. For example, the image processing apparatus may perform image processing on the stereoscopic objects to eliminate a difference in viewpoints in a vertical direction between the stereoscopic objects. The image processing apparatus may selectively perform image processing on the target objects. Operation 230 will be further described with reference to FIGS. 5, 6, 7 and 8 below.

When the image pair is determined not to include the target objects, the image processing apparatus may perform the same image processing on the stereoscopic objects in operation 231.

Figure 3:
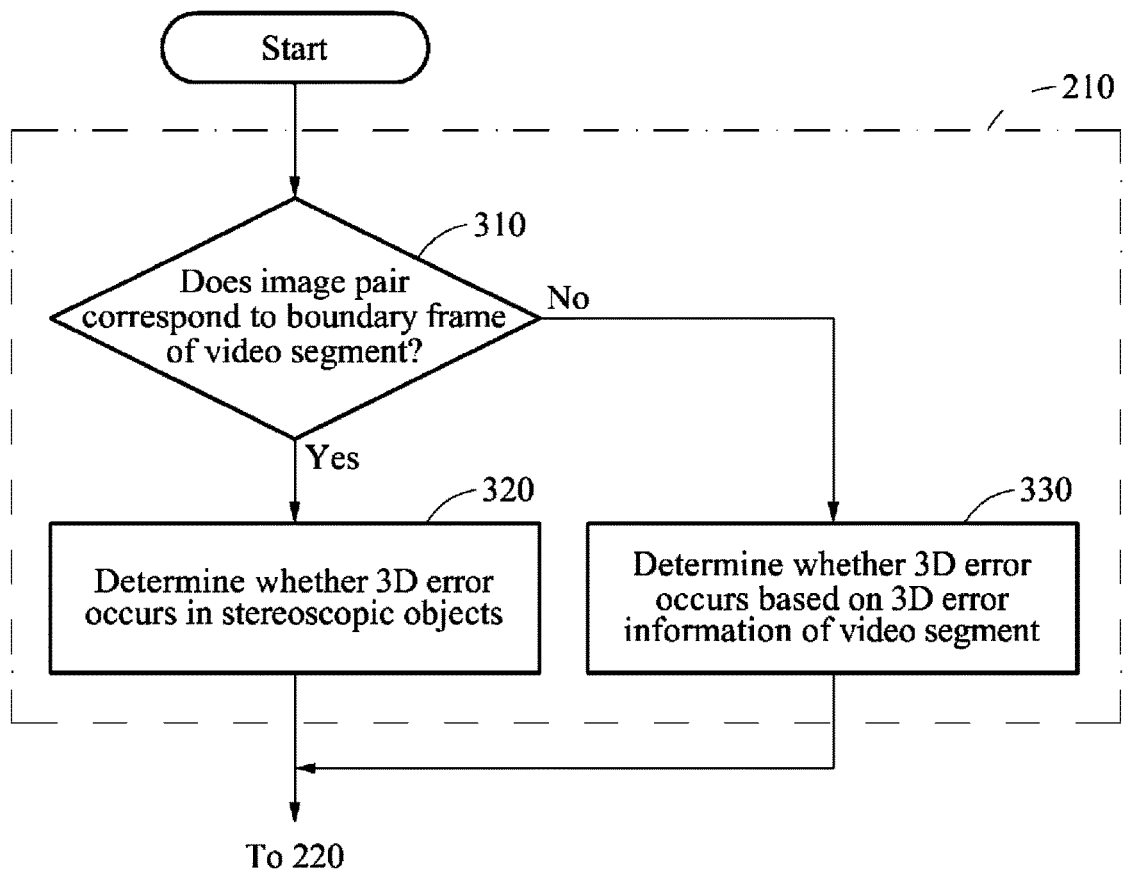
FIG. 3 is a flowchart illustrating an operation of determining whether stereoscopic objects in an image pair are aligned on the same horizontal line, to determine whether a three-dimensional (3D) error occurs in the stereoscopic objects in the image processing method of FIG. 2.

FIG. 3 illustrates operation 210 of FIG. 2 to determine whether a 3D error occurs in the stereoscopic objects in the image pair.

Operation 210 may include operations 310 through 330.

In operation 310, the image processing apparatus (e.g., image processing apparatus 900 of FIG. 9) may determine whether a current image pair to be processed corresponds to a boundary frame of a video segment.

A 3D video may include a plurality of image pairs in chronological order, and the plurality of image pairs may be distinguished by at least one video segment. Because a single video segment corresponds to a desired (or alternatively, predetermined) captured scene, image pairs included in the video segment may have, in common, a geometric feature based on an image sensor that captures the scene. In other words, image pairs included in the same video segment may have the same geometric feature, whereas different video segments may have different geometric features due to a scene change or a change of the image sensor.

Because image pairs included in the same video segment have the same geometric feature, a calculation, for example, an estimation of a 3D error in a video segment, or an estimation of a correction and transformation may be performed only once. For example, when a 3D error is estimated from an image pair corresponding to a boundary frame of a video segment, the 3D error is not estimated from the other image pairs included in the video segment.

Accordingly, prior to determining whether the stereoscopic objects are aligned on the same horizontal line (for example, whether a 3D error occurs), the image processing apparatus may determine whether an image pair desired to be processed corresponds to a boundary frame of a video segment. For example, the image processing apparatus may determine whether the image pair corresponds to a starting boundary frame of the video segment.

In an example embodiment, the image processing apparatus may determine whether a current image pair corresponds to a boundary frame of a video segment using an image feature vector of the current image pair and an image feature vector of a previous image pair.

An image feature vector may be a vector representing a feature of an image using a plurality of parameters. The image feature vector may include, for example, a gradient map, a mean square error and/or a color histogram associated with an image.

The image processing apparatus may calculate a rate of change between the image feature vectors by comparing the image feature vector of the current image pair to the image feature vector of the previous image pair. For example, the image processing apparatus may calculate the rate of change between the image feature vectors based on a Euclidean distance between the image feature vectors.

When the rate of change between the image feature vectors exceeds a threshold rate, the image processing apparatus may determine that the current image pair corresponds to the boundary frame. The threshold rate may be set using various schemes, for example, may be input in advance by a user or may be determined based on a statistical analysis result acquired by applying a statistical algorithm to a video sample.

In another example, the image processing apparatus may determine whether an image pair corresponds to a boundary frame of a video segment based on a video property parameter, for example, a capturing date and/or a capturing place for a 3D video. In still another example, the image processing apparatus may determine whether an image pair corresponds to a boundary frame of a video segment based on a sensor property parameter associated with a property of an image sensor that captures a 3D video.

When the image pair is determined to correspond to the boundary frame, the image processing apparatus may estimate a geometric feature of the image pair and may determine whether a 3D error occurs in the stereoscopic objects in operation 320. Based on a determination result, the image processing apparatus may determine information about the 3D error and information about 3D transformation. In the following description, information about the 3D error and information about 3D transformation may be referred to as "3D error information" and "3D transformation information," respectively.

When an image pair on which image processing is to be performed corresponds to a boundary frame (for example, a first frame) of a video segment, the image processing apparatus may estimate a geometric feature of the video segment. For example, the image processing apparatus may determine, based on the estimated geometric feature, whether a 3D error occurs in stereoscopic objects included in the image pair. In other words, the image processing apparatus may determine, based on the estimated geometric feature, whether a first image and a second image that are included in the image pair are different from each other in viewpoints in the vertical direction. Also, the image processing apparatus may update 3D error information and 3D transformation information based on a determination result.

When the 3D error is determined not to occur in the stereoscopic objects, the 3D error information may include information indicating that there is no 3D error, and the 3D transformation information may include information indicating that an image is not transformed.

Conversely, when the 3D error is determined to occur in the stereoscopic objects, the 3D error information may include a parameter associated with the 3D error. The 3D error information may include a parameter representing a geometric transformation relationship between stereoscopic objects included in an image pair. The geometric transformation relationship may be, for example, a rotation and/or a parallel movement between stereoscopic objects in 3D space. Also, the 3D error information may include information indicating that the 3D error occurs. The 3D transformation information may include information associated with a transformation to correct the determined 3D error.

When the image pair is determined not to correspond to the boundary frame, the image processing apparatus may determine whether the 3D error occurs in the stereoscopic objects based on 3D error information of the video segment in operation 330. The video segment may include the image pair.

The image processing apparatus may determine, as a nonboundary frame, an image pair that does not correspond to the boundary frame. Because the image processing apparatus updates the 3D error information and the 3D transformation information based on the image pair corresponding to the boundary frame, the image processing apparatus may determine, based on the updated 3D error information, whether a 3D error occurs in the image pair determined as the nonboundary frame.

Figure 4:
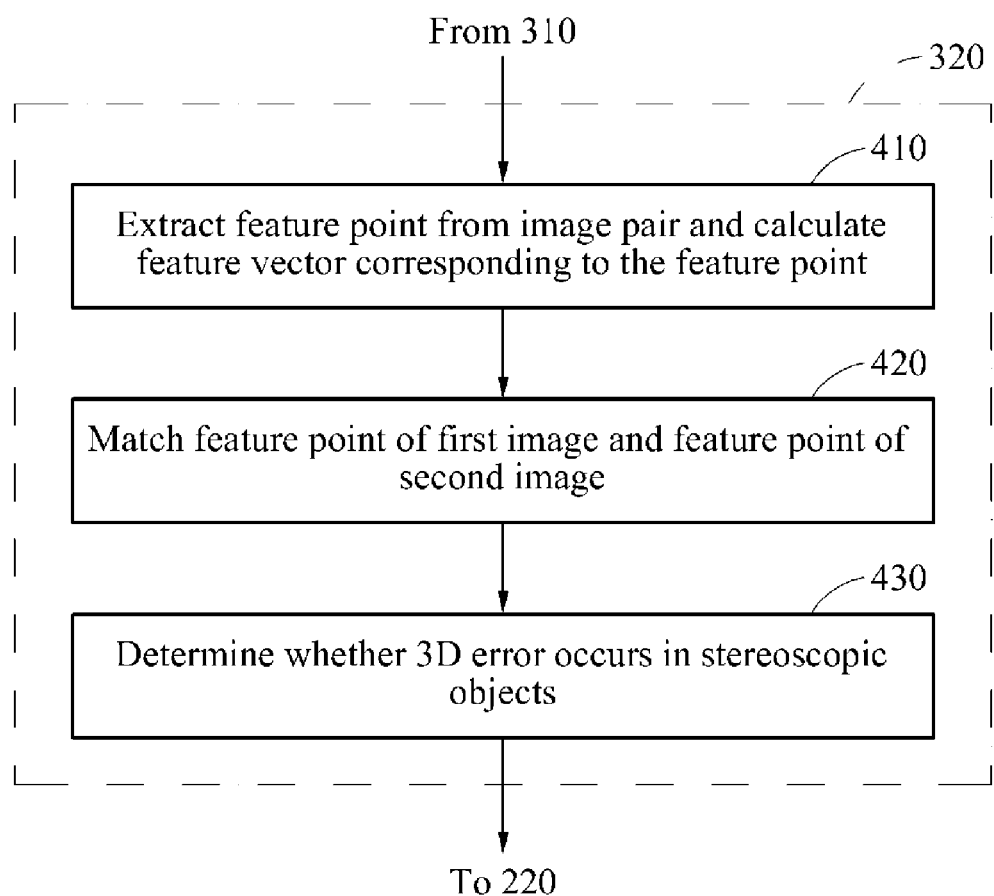
FIG. 4 is a flowchart illustrating an operation of FIG. 3 to determine whether a 3D error occurs in the stereoscopic objects.

FIG. 4 illustrates operation 320 of FIG. 3 to determine whether a 3D error occurs in the image pair.

Operation 320 may include operations 410 through 430.

In operation 410, the image processing apparatus (e.g., image processing apparatus 900 in FIG. 9) may extract a feature point corresponding to an eigenvector from each of a first image and a second image, and may calculate a feature vector corresponding to the feature point. The first image and the second image may be included in the image pair.

For example, the image processing apparatus may determine, as a feature point, an image corner extracted from each of the first image and the second image, and may determine a scale-invariant feature transform (SIFT) operator as a feature vector.

In operation 420, the image processing apparatus may match the feature point of the first image and the feature point of the second image based on a similarity between determined feature vectors. For example, the image processing apparatus may determine a matching relationship between the feature points based on a similarity between feature points based on the SIFT operator.

In operation 430, the image processing apparatus may determine whether the 3D error occurs in the stereoscopic objects in the image pair based on the matched feature points.

The image processing apparatus may determine a histogram by statistically processing vertical coordinates of pixels included in the first image and the second image and vertical distances between the pixels. When a number of pixels, each having a value exceeding a set threshold, exceeds a set threshold number of pixels (for example, three pixels), the image processing apparatus may determine that the 3D error occurs in the stereoscopic objects.

In addition, the image processing apparatus may estimate a relative movement of positions of image sensors that capture the first image and the second image, and may determine whether the 3D error occurs in the stereoscopic objects, based on a parameter associated with the estimated relative movement.

Figure 5:
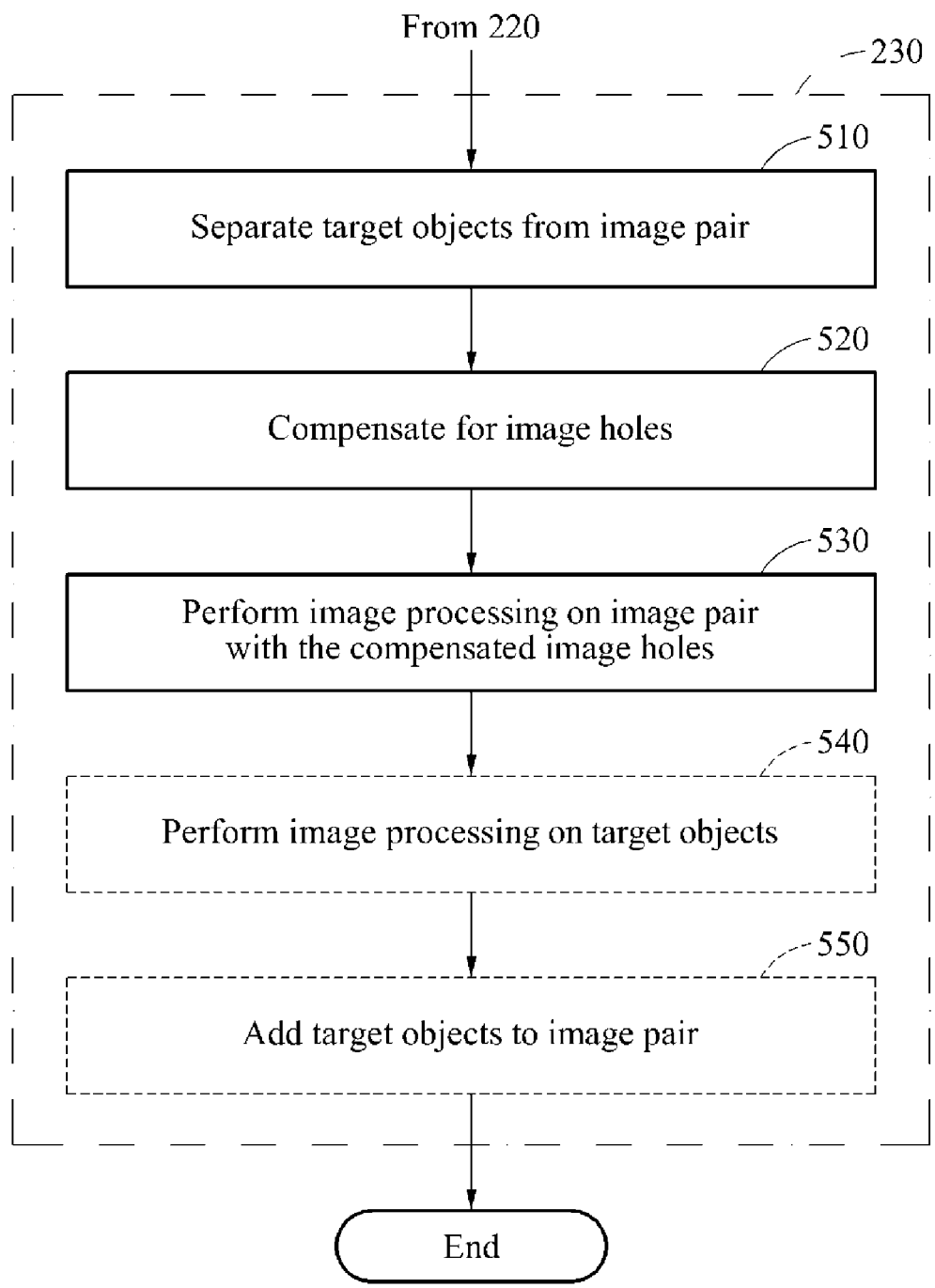
FIG. 5 is a flowchart illustrating an operation of performing image processing differently for stereoscopic objects and for target objects in the image processing method of FIG. 2.

FIG. 5 illustrates operation 230 of FIG. 2.

Operation 230 may include operations 510 through 550.

In operation 510, the image processing apparatus (e.g., image processing apparatus 900 in FIG. 9) may separate the target objects from the image pair.

The image processing apparatus may separate the target objects from the image pair based on an image feature, for example, a color, a texture, a gradient and/or a gray level of each of a first image and a second image that are included in the image pair.

Generally, the target objects may be, for example, an object that is added to an image acquired by an image sensor (i.e., a post-capture object) during editing of the image. The target objects may be of at least one type, and a scheme of separating the target objects from the image pair may be determined based on the at least one type. For example, the image processing apparatus may separate the target objects from the image pair based on at least one of a morphological feature, a temporal feature and a geometric feature of each of the target objects. The geometric feature may meet a standard.

In operation 520, the image processing apparatus may compensate for image holes generated by separating the target objects from the image pair.

When the target objects are separated from the image pair, image holes may be generated in positions of the target objects in the first image and the second image. The image processing apparatus may fill the image holes based on areas other than the image holes in the first image and the second image.

In an example, the image processing apparatus may assign, to a pixel included in an image hole, a value of a pixel closest to the pixel in the image hole among pixels included in the other areas. The image processing apparatus may set, as a value of the pixel in the image hole, a value of a pixel located at a minimum horizontal distance, a minimum vertical distance or a minimum distance from the pixel in the image hole among the pixels in the other areas. The image processing apparatus may repeatedly perform the above scheme until pixel values are assigned to all pixels included in the image hole. Also, the image processing apparatus may estimate pixel values from an edge portion to a central portion of the image hole based on an interpolation scheme.

In another example, the image processing apparatus may fill an image hole based on a texture feature of a pixel adjacent to the image hole. This scheme may be desirable when a relatively large image hole is generated. The image processing apparatus may extract a texture feature of an area adjacent to the image hole. The texture feature may include, for example, a directional feature shown in an image, or a feature repeatedly represented in a texture. The image processing apparatus may fill the image hole with an image that is generated based on the extracted texture feature.

In still another example, the image processing apparatus may estimate content information of the image pair based on type information of an object adjacent to an image hole, and may fill the image hole based on the estimated content information. The image processing apparatus may extract a texture feature of the object adjacent to the image hole based on an image filtering scheme, may identify the type information of the object based on the extracted texture feature, and may fill the image hole based on the content information estimated based on the type information.

In yet another example, the image processing apparatus may fill an image hole based on the first image and the second image. The first image and the second image may be images acquired by capturing the same scene at different viewpoints, and may be different in viewpoints from each other. For example, an object occluded by a target object in the first image may be included in the second image. Similarly, an object occluded by a target object in the second image may be included in the first image. Accordingly, the image processing apparatus may fill an image hole of the first image based on an object shown in the second image. Similarly, the image processing apparatus may fill an image hole of the second image based on an object shown in the first image.

In operation 530, the image processing apparatus may perform image processing on the image pair with the compensated image holes.

Because the stereoscopic objects in the image pair with the compensated image holes have the same geometric feature, a new 3D error does not occur even when the same image processing is performed on the image pair. For example, the image processing apparatus may correct a 3D error in stereoscopic objects in an image pair using a scheme generally used in a field of technologies of correcting a 3D error or using a 3D correction scheme that will be developed in the future.

In accordance with at least one example embodiment, a process of inserting the separated target objects into the image pair in which the 3D error is corrected may be performed. The process may be performed based on information about content of the image pair, information about stereoscopic objects included in the image pair and/or a command input by a user. For example, when it is determined that the process is not additionally performed, the image processing apparatus may perform operation 530 and terminate the image processing method of FIG. 2.

The image processing apparatus may sequentially or simultaneously perform operations 520 and 530.

When it is determined that the process of inserting the separated target objects should be additionally performed, the image processing apparatus may perform image processing on the target objects in operation 540, prior to inserting the target objects into the image pair. The image processing apparatus may transform the target objects, for example, by changing a size, a position and/or a depth of each of the target objects, based on an analysis on the image pair.

The image processing apparatus may perform image processing on the target objects based on at least one of a difference in viewpoints between the first image and the second image in the image pair, information about an apparatus for displaying the image pair and information about content of the image pair.

For example, the image processing apparatus may analyze the difference in viewpoints between the first image and the second image, may determine a depth of an object closest to a viewer among objects included in the image pair, and may control a depth of a caption-type target object so that the caption-type target object may be located closest to the viewer among the objects in the image pair.

Also, an optimum depth range may be set in advance in a display apparatus for displaying an image pair. The image processing apparatus may perform image processing on a target object having a depth exceeding a desired (or alternatively, optimum) depth range. The image processing apparatus may adjust the depth of the target object so that the depth does not exceed the optimum depth range.

In addition, the image processing apparatus may identify a region of interest (ROI) that is interesting to a viewer among areas in the image pair. The image processing apparatus may perform image processing so that the ROI is not occluded by a target object. When the ROI is occluded by the target object, the image processing apparatus may adjust at least one of a size and a position of the target object so that the ROI is not occluded by the target object. For example, the image processing apparatus may adjust at least one of a size and a position of a target object of a caption type so that the ROI is not occluded by the target object.

The image processing apparatus may perform operation 540 between operations 510 and 550, instead of needing to necessarily perform operation 540 after operation 530.

In operation 550, the image processing apparatus may add the target objects to the image pair with the compensated image holes. The image processing apparatus may add the target objects on which the image processing is performed in operation 540. When operation 540 is not performed, the image processing apparatus may insert the target objects in the original positions of the target objects.

Figure 6:
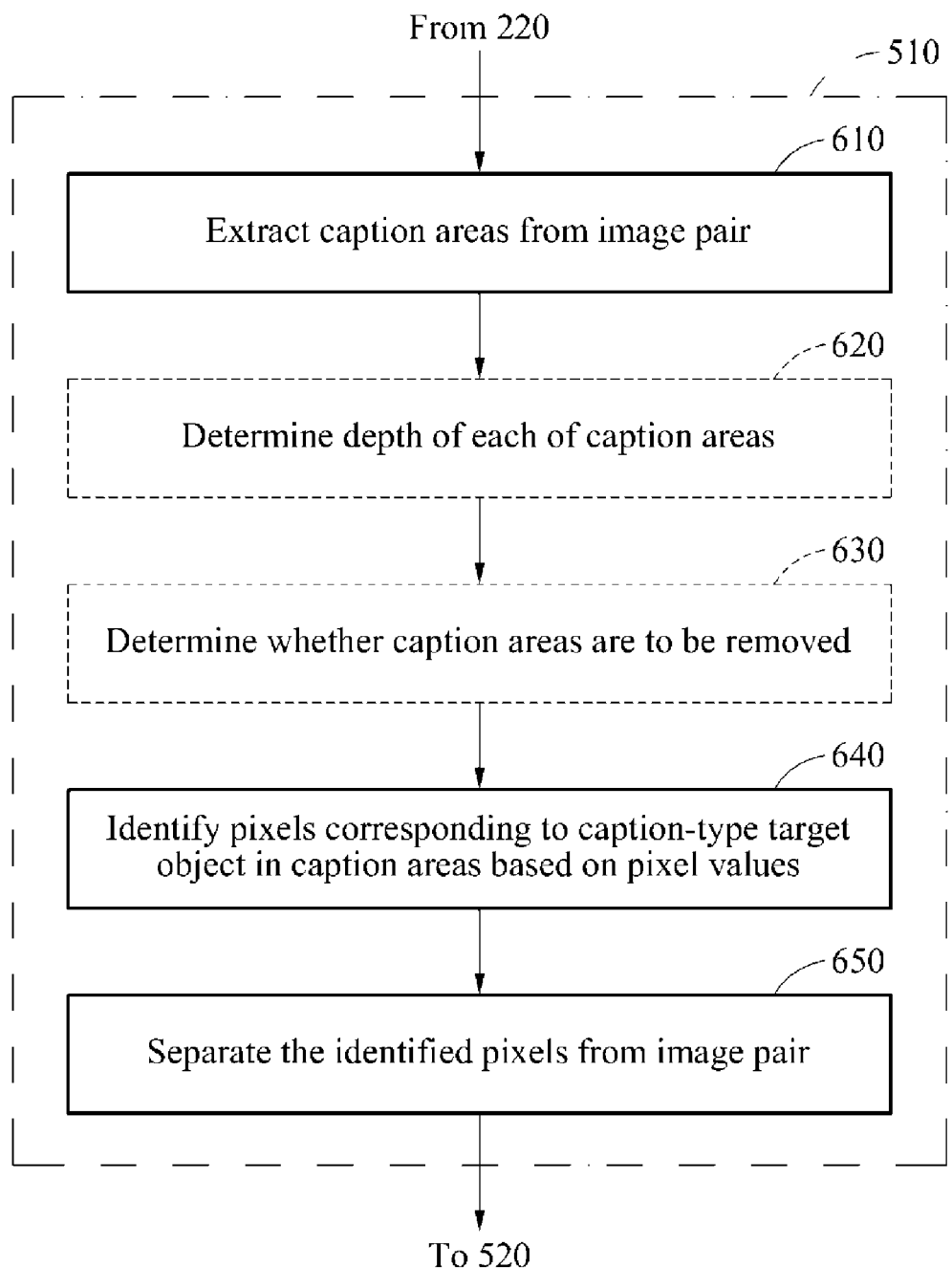
FIG. 6 is a flowchart illustrating an example of an operation of FIG. 5 to separate the target objects from the image pair, to explain a method of separating caption-type target objects from the image pair.

FIG. 6 illustrates an example of operation 510 of FIG. 5 to explain a method of separating caption-type target objects from the image pair.

When the target objects separated from the image pair are caption-type target objects, operation 510 may include operations 610 through 650.

In operation 610, the image processing apparatus (e.g., image processing apparatus 900 in FIG. 9) may extract caption areas from the image pair based on morphological features of the target objects.

For example, the image processing apparatus may identify a caption area based on a number of letter strokes in a caption-type target object. The image processing apparatus may project the first image and the second image onto a horizontal axis and a vertical axis, respectively, may identify an area in which a value exceeds a set threshold in the horizontal axis or the vertical axis based on a projection result, and may extract the identified area as a caption area including the caption-type target object.

In operation 620, the image processing apparatus may match caption areas corresponding to each other in the image pair, and may determine a depth of each of the caption areas. The image processing apparatus may match a caption area of the first image and a caption area of the second image, and may generate information about a depth of each of the matched caption areas.

In operation 630, the image processing apparatus may determine whether the caption areas are to be removed based on the determined depth.

Generally, a caption-type target object among objects included in the image pair may be displayed at a position closest to a viewer. The image processing apparatus may determine whether a caption area is displayed at a position closest to the viewer based on a depth of the caption area. When it is determined that the caption area is not displayed at the position closest to the viewer, the image processing apparatus may determine that the caption area is incorrectly detected and may remove the caption area. When it is determined that the caption area is displayed at the position closest to the viewer, the image processing apparatus may maintain the caption area and may continue to perform image processing on the caption area.

In accordance with at least one example embodiment, operations 620 and 630 are not performed. In other words, the image processing apparatus may continue to perform image processing on the extracted caption areas, instead of determining whether the extracted caption areas are to be removed.

In operation 640, the image processing apparatus may identify pixels corresponding to a caption-type target object in each of the caption areas based on pixel values. For example, the image processing apparatus may extract a color of a caption based on values of pixels included in a caption area, and may identify pixels having the extracted color from the caption area.

In operation 650, the image processing apparatus may separate the identified pixels from the image pair. The image processing apparatus may determine the identified pixels as pixels representing a caption-type target object and may separate the identified pixels from the image pair.

Figure 7:
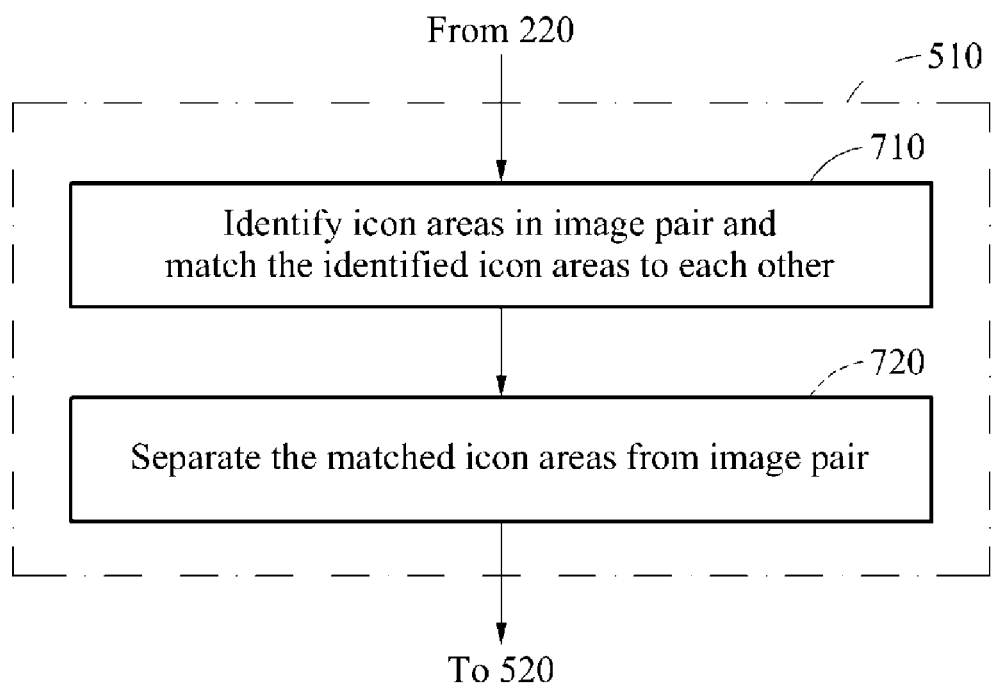
FIG. 7 is a flowchart illustrating another example of an operation of FIG. 5 to separate the target objects from the image pair, to explain a method of separating icon-type target objects from the image pair.

FIG. 7 illustrates another example of operation 510 of FIG. 5 to explain a method of separating icon-type target objects from the image pair.

When the target objects separated from the image pair are icon-type target objects, operation 510 may include operations 710 and 720.

An icon-type target object may be an object inserted into an image pair to supplement or strengthen content included in the image pair, and may include, for example, an object representing a television (TV) station or a TV program copyright. The icon-type target object may have a temporal characteristic stable over time. For example, the icon-type target object may be in a static state over time or may periodically change, and may be located in a fixed position on a display screen.

In operation 710, the image processing apparatus may identify icon areas in the image pair based on a template image associated with icons, and may match the identified icon areas to each other. The template image may be formed in advance.

In operation 720, the image processing apparatus may separate the matched icon areas from the image pair.

The image processing apparatus may form a template image associated with icons based on an offline processing scheme.

The image processing apparatus may initialize the template image. Values of pixels included in the template image may be floating point numbers between "0" and "1" and may indicate whether the template image is associated with icons.

In addition, the image processing apparatus may determine a difference in pixel values (for example, colors) between two temporally neighboring image pairs among image pairs input in the chronological order. The image processing apparatus may update the values of the pixels in the template image based on the difference in the pixel values, using an exponential function as a multiplier factor. For example, when a pixel does not correspond to the template image, the pixel may be updated to have a value close to "0." Conversely, when a pixel corresponds to the template image, the pixel may be updated to have a value close to "1." When a rate of change in pixel values due to updating is less than a set threshold rate, the image processing apparatus may stop the updating and may determine pixels having values close to "1" as pixels included in a template image associated with an icon. For example, when last updated values of pixels exceed a reference value set between "0" and "1," the image processing apparatus may determine the pixels as pixels included in a template image associated with an icon.

The image processing apparatus may separate the icon-type target objects from the image pair using various schemes, for example, a Canny edge detection operator or other icon detection schemes.

Figure 8:
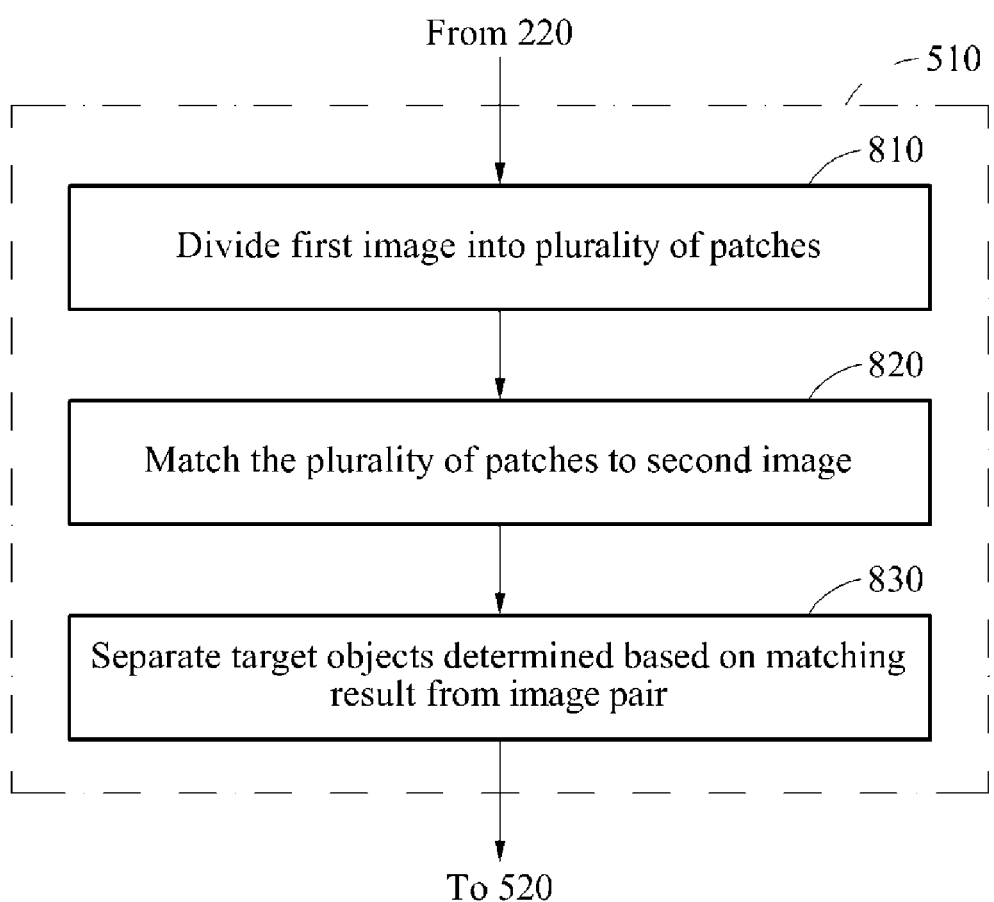
FIG. 8 is a flowchart illustrating still another example of an operation of FIG. 5 to separate the target objects from the image pair, to explain a method of separating typical target objects from the image pair.

FIG. 8 illustrates still another example of operation 510 of FIG. 5 to explain a method of separating typical target objects from the image pair.

When the target objects separated from the image pair are typical target objects, operation 510 may include operations 810 through 830.

A typical target object may be an object represented by a combination of at least one figure, and may not have a typical characteristic, for example, a constant morphological feature of a caption-type target object or a characteristic of an icon-type target object stable over time. The typical target object may be an object included in an image pair based on a geometric feature meeting a standard, and may have a geometric feature meeting the standard.

In operation 810, the image processing apparatus (e.g., image processing apparatus 900 in FIG. 9) may divide one of the images (for example, a first image) included in the image pair into a plurality of patches. The plurality of patches may refer to areas into which the first image is divided. For example, the image processing apparatus may divide the first image into a plurality of patches using various schemes, for example, a mean shift, a classification of thresholds, or an edge detection.

In operation 820, the image processing apparatus may match the plurality of patches to a second image corresponding to the first image. The image processing apparatus may match desired patches of the first image to areas of the second image that are on the same horizontal line as the patches.

In an example, the image processing apparatus may calculate a matching score based on the matching. The matching score may indicate a similarity between a current patch to be processed and an area of the second image that is on the same horizontal line as the current patch. The image processing apparatus may determine that a target object is included in a patch having a highest matching score among calculated matching scores. In other words, the image processing apparatus may determine that target objects are included in a patch and an area that are most similar to each other.

In another example, the image processing apparatus may calculate a matching score based on a normalized mean square error for pixel values of a patch and pixel values of an area. Based on the normalized mean square error, the image processing apparatus may calculate the matching score regardless of an influence of an average luminance and a size of a patch, and may detect a target object.

In still another example, the image processing apparatus may calculate a matching score indicating a degree of difference between a current patch to be processed and an area of the second image that is on the same horizontal line as the current patch.

In operation 830, the image processing apparatus may separate the target objects determined based on a matching result from the image pair.

The image processing apparatus may determine, based on whether a matching score satisfies a preset condition, whether a corresponding patch includes a target object. For example, in response to a calculated matching score exceeding a first threshold score, the image processing apparatus may determine that a corresponding patch includes a target object. When a calculated matching score indicates a degree of difference between patches of the first image and areas of the second image and does not exceed a second threshold score, the image processing apparatus may determine that a corresponding patch includes a target object. The first threshold score and the second threshold score may be determined in advance by a user or determined based on an experimental result.

The stereoscopic objects in the image pair are not be aligned on the same horizontal line due to the 3D error, and accordingly a matching score between the stereoscopic objects may be distinguished from a matching score between the target objects. The image processing apparatus may identify target objects in the image pair based on the matching score.

The image processing apparatus may separate the target object based on the matching score from the image pair.

It should be apparent to one of ordinary skill in the art that the description of operations 810 through 830 of FIG. 8 may also be applied to a method of separating caption-type target objects or icon-type target objects from an image pair.

Figure 9:
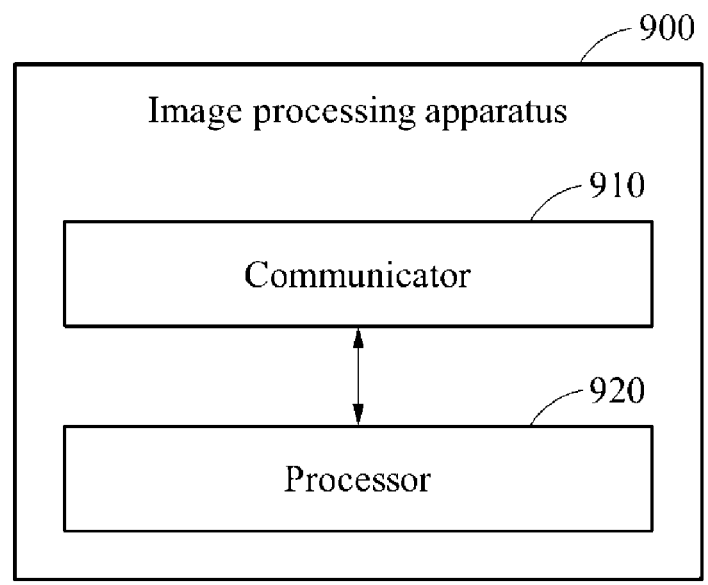
FIG. 9 is a block diagram illustrating an image processing apparatus according to at least one example embodiment.

FIG. 9 illustrates an image processing apparatus 900 according to at least one example embodiment.

Referring to FIG. 9, the image processing apparatus 900 may include a communicator 910 and a processor 920. The image processing apparatus 900 may be in wide use in a glasses-based 3D display technology, a glasses-free 3D display technology, and a technology of displaying 3D images on displays of various sizes. The image processing apparatus 900 may be included in various computing devices and/or systems, for example, a smartphone, a tablet computer, a laptop computer, a desktop computer, a TV, a wearable device, or a smart home system.

The communicator 910 may receive a 3D video including an image pair. The communicator 910 may receive a 3D video from an image sensor, a memory or a server. The communicator 910 may transfer the 3D video to the processor 920 to perform image processing on the 3D video.

The 3D video may include a plurality of image pairs in chronological order, and the plurality of image pairs may be distinguished by at least one video segment. Video segments may be distinguished from each other based on a scene change or a change of an image sensor that captures a scene, and image pairs included in the same video segment may have the same geometric feature in common.

The processor 920 may be an apparatus for performing image processing on the image pair in the 3D video, and may be, for example, at least one processor.

The processor 920 may determine whether stereoscopic objects are aligned on the same horizontal line. The stereoscopic objects may be included in an image pair and may correspond to each other.

The processor 920 may determine whether a current image pair to be processed corresponds to a boundary frame of a video segment. For example, when an image pair corresponds to a boundary frame of a video segment, the processor 920 may estimate a geometric feature of the image pair and may determine whether a 3D error occurs in stereoscopic objects in the image pair. Based on a determination result, the image processing apparatus 900 (via the processor 920) may determine 3D error information and 3D transformation information. When the image pair does not correspond to the boundary frame, the processor 920 may determine whether the 3D error occurs in the stereoscopic objects in the image pair, based on 3D error information of the video segment. The video segment may include the image pair.

When the stereoscopic objects are determined not to be aligned on the same horizontal line, the processor 920 may determine whether the image pair includes target objects. The target objects may have different geometric features from those of the stereoscopic objects. By determining whether the image pair includes the target objects, the processor 920 may reduce (or alternatively, prevent) a correction of the 3D error in the stereoscopic objects from being equally applied to the target objects.

When the image pair is determined to include the target objects, the processor 920 may perform image processing differently for the stereoscopic objects and for the target objects.

The processor 920 may separate the target objects from the image pair. The processor 920 may separate the target objects from the image pair, based on an image feature, for example, a color, a texture, a gradient or a gray level of each of a first image and a second image that are included in the image pair.

Generally, the target objects may be, for example, a post inserted object that is added to an image acquired by an image sensor during editing of the image. The target objects may be of at least one type (for example, a caption type, an icon type or a typical type), and a scheme of separating target objects may be determined based on types of target objects. For example, the processor 920 may separate the target objects from the image pair based on at least one of a morphological feature, a temporal feature and a geometric feature of each of the target objects. The geometric feature may meet a standard.

The processor 920 may compensate for image holes generated by separating the target objects from the image pair.

The processor 920 may perform image processing on the image pair with the compensated image holes. The processor 920 may fill the image holes based on areas other than the image holes in the first image and the second image.

When a process of inserting the separated target objects into the image pair is determined to be additionally performed, the processor 920 may perform image processing on the target objects, prior to inserting the target objects into the image pair.

The processor 920 may add the target objects to the image pair with the compensated image holes. The processor 920 may add the target objects on which the image processing is performed, or may insert the target objects on which the image processing is not performed in the original positions of the target objects.

The description of FIGS. 1 through 8 is also applicable to the communicator 910 and the processor 920 of FIG. 9, and accordingly is not repeated here.

According to at least one example embodiment, target objects having different geometric features from those of stereoscopic objects may be automatically detected, and accordingly a new 3D error may be prevented from occurring due to a correction of stereoscopic objects with a 3D error. Thus, it is possible to improve a quality of a correction of a 3D error, and to enhance a quality of a 3D video.

In addition, according to at least one example embodiment, when an image frame on which image processing is to be performed corresponds to a boundary frame of a video segment, whether a 3D error occurs may be determined. Accordingly, an amount of calculation required during the image processing may be significantly reduced, and thus it is possible to perform image processing in real time. Also, it is possible to increase stability of an image processing result by reducing (or alternatively, preventing) jitter from being generated on the image processing result.

Any or all units and/or modules described herein (for example, the image processing apparatus 900, the communicator 910 and the processor 920) may be implemented using hardware components, software components, or a combination thereof. For example, the hardware components may include an application specific integrated circuit (ASIC), microphones, amplifiers, band-pass filters, audio to digital convertors, and/or processing devices. A processing device may be implemented using one or more hardware device configured to carry out and/or execute program code by performing arithmetical, logical, and input/output operations. The processing device(s) may include a processor (i.e., a special purpose processor), a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments when executed by a processor (e.g., a special purpose processor). The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An image processing method comprising:
    determining whether stereoscopic objects are aligned on a same horizontal line by determining if a difference in viewpoint in a vertical direction exists between a first image and a second image included in an image pair, the stereoscopic objects being included in the image pair and corresponding to each other;
    determining whether the image pair includes target objects if the stereoscopic objects are not aligned on the same horizontal line, the target objects having different geometric features from geometric features of the stereoscopic objects; and
    performing image processing for the stereoscopic objects and for the target objects if the image pair includes the target objects, the image processing for the stereoscopic objects being different than the image processing for the target objects, the performing image processing including,
        separating the target objects from the image pair,
        compensating for image holes generated by separating the target objects from the image pair, and
        if the difference in viewpoint in the vertical direction exists, reducing the difference in viewpoints in the vertical direction between the stereoscopic objects by performing image processing on the image pair with the compensated image holes.

2. The image processing method of claim 1, wherein the first and second images are acquired by capturing a same scene at different viewpoints.

3. The image processing method of claim 1, wherein the separating separates the target objects from the image pair based on at least one of a morphological feature, a temporal feature and a geometric feature of each of the target objects, the geometric feature meeting a standard.

4. The image processing method of claim 3, wherein the target objects are caption-type target objects, and
    wherein the separating comprises,
        extracting caption areas from the image pair based on the morphological feature,
        identifying pixels corresponding to the caption-type target objects in the caption areas based on pixel values included in the caption areas, and
        separating the identified pixels from the image pair.

5. The image processing method of claim 4, wherein the separating further comprises:
    matching the caption areas in the image pair and determining a depth of each of the caption areas; and
    determining, based on the depth, whether the caption areas are to be removed.

6. The image processing method of claim 3, wherein the target objects are icon-type target objects, and
    wherein the separating comprises,
        matching icon areas in the image pair based on a template image, the template image being formed and associated with icons, and
        separating the matched icon areas from the image pair.

7. The image processing method of claim 6, wherein the template image is determined based on last updated pixel values by updating pixel values of the template image based on a difference in pixel values between the image pair and a neighboring image pair temporally adjacent to the image pair, and
    wherein the updating is repeated until a rate of change in the pixel values due to the updating is less than a threshold rate.

8. The image processing method of claim 3, wherein the separating comprises:
    dividing the first image included in the image pair into a plurality of patches;
    matching the plurality of patches to the second image, the second image being included in the image pair and corresponding to the first image; and separating the target objects based on a result of the matching from the image pair.

9. The image processing method of claim 8, wherein the matching comprises calculating a matching score indicating a similarity between the plurality of patches and areas of the second image, the areas being on the same horizontal line as the plurality of patches, and
wherein the separating the target objects based on the result of the matching from the image pair comprises determining the target objects based on the matching score and separating the determined target objects from the image pair.

10. The image processing method of claim 1, wherein the compensating compensates for the image holes based on areas other than the image holes in the image pair.

11. The image processing method of claim 10, wherein the compensating compensates for the image holes based on one of:
a scheme of compensating for a pixel included in the image hole based on values of pixels closest to the pixel in the image hole among pixels included in areas other than the image hole;
a scheme of compensating for the image holes based on a texture feature of a pixel adjacent to the image hole;
a scheme of estimating content information of the image pair based on type information of an object adjacent to the image hole and compensating for the image holes based on the estimated content information; and
a scheme of compensating for the image holes based on the first image and the second image, the first image and the second image being included in the image pair.

12. The image processing method of claim 1, wherein the performing image processing comprises:
performing image processing on the separated target objects; and
adding the target objects on which the image processing is performed to the image pair on which the image processing is performed.

13. The image processing method of claim 1, wherein the determining whether the stereoscopic objects are aligned on the same horizontal line comprises:
determining whether the image pair corresponds to a boundary frame of a video segment, the image pair being included in the video segment;
estimating a geometric feature of the image pair and determining whether the stereoscopic objects are aligned on the same horizontal line if the image pair is corresponds to the boundary frame; and
determining, based on estimated information about the video segment, whether the stereoscopic objects are aligned on the same horizontal line if the image pair does not correspond to the boundary frame.

14. The image processing method of claim 13, wherein the determining whether the image pair corresponds to the boundary frame comprises:
comparing an image feature vector of the image pair to an image feature vector of a previous image pair preceding the image pair; and
determining whether the image pair corresponds to the boundary frame based on the comparing.

15. The image processing method of claim 1, wherein each of the target objects is an object added to the image pair during editing of the image pair.

16. A non-transitory computer-readable storage medium storing computer readable instructions, which when executed by a processor, cause the processor to perform the method of claim 1.

17. An image processing apparatus comprising:
a communicator configured to receive an image pair included in a three-dimensional (3D) video; and
at least one processor configured to execute computer-readable instructions to,
determine whether stereoscopic objects are aligned on a same horizontal line by determining if a difference in viewpoint in a vertical direction exists between a first image and a second image included in an image pair, the stereoscopic objects being included in the image pair and corresponding to each other,
determine whether the image pair includes target objects if the stereoscopic objects are not aligned on the same horizontal line, the target objects having different geometric features from those of the stereoscopic objects, and
perform image processing for the stereoscopic objects and for the target objects if the image pair includes the target objects, the image processing for the stereoscopic objects being different from the image processing for the target objects, the at least one processor being further configured to,
separate the target objects from the image pair,
compensate for image holes generated by separating the target objects from the image pair, and
if the difference in viewpoint in the vertical direction exists, reduce the difference in viewpoints in the vertical direction between the stereoscopic objects by performing image processing on the image pair with the compensated image holes.

18. An image processing apparatus comprising:
a communicator configured to receive an image pair included in a three-dimensional (3D) video, the image pair including stereoscopic objects and target objects, the stereoscopic objects corresponding to each other and being part of a captured scene, the target objects being added to the image pair after the captured scene; and
at least one processor configured to execute computer readable instructions to,
determine whether stereoscopic objects are aligned on a same horizontal line by determining if a difference in viewpoint in a vertical direction exists between a first image and a second image included in an image pair, and
perform image processing for the stereoscopic objects and for the target objects if the stereoscopic objects are not aligned on the same horizontal line, the image processing for the stereoscopic objects being different from the image processing for the target objects, the at least one processor being further configured to,
separate the target objects from the image pair,
compensate for image holes generated by separating the target objects from the image pair, and
if the difference in viewpoint in the vertical direction exists reduce the difference in viewpoints in the vertical direction between the stereoscopic objects by performing image processing on the image pair with the compensated image holes.

* * * * *